(12) United States Patent
Obana

(10) Patent No.: US 9,850,354 B2
(45) Date of Patent: Dec. 26, 2017

(54) RUBBER ARTICLE REINFORCING STEEL WIRE AND RUBBER ARTICLE USING SAME

(71) Applicant: BRIDGESTONE CORPORATION, Tokyo (JP)

(72) Inventor: Naohiko Obana, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 303 days.

(21) Appl. No.: 14/768,247

(22) PCT Filed: Feb. 28, 2014

(86) PCT No.: PCT/JP2014/055193
§ 371 (c)(1),
(2) Date: Aug. 17, 2015

(87) PCT Pub. No.: WO2014/133175
PCT Pub. Date: Sep. 4, 2014

(65) Prior Publication Data
US 2015/0376351 A1 Dec. 31, 2015

(30) Foreign Application Priority Data
Mar. 1, 2013 (JP) ................. 2013-040333

(51) Int. Cl.
*C08J 5/00* (2006.01)
*B60C 9/00* (2006.01)
*D07B 1/06* (2006.01)

(52) U.S. Cl.
CPC ............. *C08J 5/00* (2013.01); *B60C 9/0007* (2013.01); *D07B 1/0606* (2013.01);
(Continued)

(58) Field of Classification Search
USPC ............ 87/1–13; 57/200–260, 902; 428/357–407; 152/451, 527, 556
See application file for complete search history.

(56) References Cited

U.S. PATENT DOCUMENTS

| | | |
|---|---|---|
| 5,888,321 A | 3/1999 | Kazama et al. |
| 2005/0000617 A1 | 1/2005 | Tsuruta |
| 2011/0206552 A1 | 8/2011 | Shimizu |

FOREIGN PATENT DOCUMENTS

| | | |
|---|---|---|
| CN | 1604858 A | 4/2005 |
| CN | 102202808 A | 9/2011 |

(Continued)

OTHER PUBLICATIONS

Machine Translation of JP H06-184965 obtained Aug. 23, 2017.*
(Continued)

*Primary Examiner* — Frank Vineis
(74) *Attorney, Agent, or Firm* — Sughrue Mion, PLLC

(57) ABSTRACT

Provided are a rubber article reinforcing steel wire that is superior in bending fatigue properties to the related art and has a flat cross-sectional shape, and a rubber article using the wire. In a rubber article reinforcing steel wire 10, a major diameter and a minor diameter are substantially perpendicular to each other. Assuming that the major diameter is W, the minor diameter is T, a straight line that passes through a center of the major diameter in a width direction and is parallel to a minor diameter direction is L1, a straight line that passes through a center of the minor diameter in a width direction and is parallel to a major diameter direction is L2, an intersection point of the L1 and the L2 is a center point C, a region within a half of a distance from the center point C to a surface is a central region Rc, and a region outside the central region Rc is a surface layer region Rs, a Vickers hardness Hvc of the central region Rc is more than a Vickers hardness Hvs of the surface layer region Rs; and assuming that a Vickers hardness on the L1 in the surface layer region Rs is Hv1, and a Vickers hardness on the L2 in the surface layer region Rs is Hv2, relationships represented by Hvc–
(Continued)

$Hv1 \leq 150$, $Hvc-Hv2 \leq 150$, $Hv1/Hvc \times 100 \geq 85.11$, and $Hv2/Hvc \times 100 \geq 79.84$ are satisfied.

8 Claims, 2 Drawing Sheets

(52) U.S. Cl.
CPC ........... *C08J 2321/00* (2013.01); *D07B 1/066* (2013.01); *D07B 2201/2003* (2013.01); *D07B 2201/2005* (2013.01); *D07B 2201/2009* (2013.01); *D07B 2201/2014* (2013.01); *D07B 2205/3057* (2013.01); *D07B 2401/206* (2013.01)

(56) References Cited

FOREIGN PATENT DOCUMENTS

| JP | 56-13003 U | 2/1981 |
| JP | 61-12989 A | 1/1986 |
| JP | 06-184965 A | 7/1994 |
| JP | 08-156514 A | 6/1996 |
| JP | 09-87982 A | 3/1997 |
| JP | 2000-301913 A | 10/2000 |
| JP | 2009-041170 A | 2/2009 |
| JP | 2009-249763 A | 10/2009 |
| JP | 2009-280836 A | 12/2009 |
| JP | 2010-047877 A | 3/2010 |

OTHER PUBLICATIONS

Communication dated Sep. 7, 2016, from the European Patent Office in counterpart European application No. 14757620.1.
International Search Report of PCT/JP2014/055193 dated May 27, 2014.
Communication dated Jul. 15, 2016, from the State Intellectual Property Office of the P.R.C., in counterpart Chinese application No. 201480011701.3.

\* cited by examiner

RUBBER ARTICLE REINFORCING STEEL WIRE AND RUBBER ARTICLE USING SAME

TECHNICAL FIELD

The present invention relates to rubber article reinforcing steel wires (hereinafter also simply referred to as "wires") and rubber articles using the wires, and specifically relate to a rubber article reinforcing steel wire that is superior in bending fatigue properties to the related art and has a flat cross-sectional shape, and a rubber article using the wire.

BACKGROUND ART

In recent years, demands for reducing the weights of tires for improving the fuel efficiency of automobiles have been increased. To meet such demands, the structures of steel wires used in belts as members for reinforcing tires have been examined in the past, and various novel technologies for the structures have been proposed. For example, Patent Documents 1 to 3 propose rubber article reinforcing steel wires which can improve the durability of tires while achieving weight reduction by allowing the cross-sectional shape of wires to have track, rectangular, and oval cross-sectional shapes.

In addition, bending fatigue properties are important for steel wires which can be embedded in rubber articles such as tires and industrial belts because tension and bending force are applied to the steel wires. Against such a problem, Patent Document 4 proposes a rubber article reinforcing wire having a flat cross-sectional shape which is a wire preferable as a material for reinforcing the belt of a tire and is improved in fatigue durability without deteriorating various tire performances by allowing the wire to have a smooth surface with roughness that is a predetermined value or less and by allowing the wire to have a predetermined cross-sectional shape.

RELATED ART DOCUMENTS

Patent Documents

Patent Document 1: Japanese Utility Model Laid-Open No. S56-13003
Patent Document 2: Japanese Patent Laid-Open No. S61-12989
Patent Document 3: Japanese Patent Laid-Open No. 2000-301913
Patent Document 4: Japanese Patent Laid-Open No. 2009-41170

SUMMARY OF THE INVENTION

Problems to be Solved by the Invention

However, in consideration of the longer lives of rubber articles such as tires and industrial belts in future, it becomes important to improve bending fatigue properties to superior levels to those of wires in the related art, and it is currently desired to establish a novel technology as an alternative to the related art.

Thus, an objective of the present invention is to provide a rubber article reinforcing steel wire that is superior in bending fatigue properties to the related art and has a flat cross-sectional shape, and a rubber article using the wire.

Means for Solving the Problems

As a result of extensive examination for solving the above-described problems, the present inventor found that the durability of a wire in the case of applying tension or bending force to the wire is influenced by a Vickers hardness distribution in the wire. As a result of further extensive examination based on such findings, the present inventor found that the above-described problems can be solved by allowing a Vickers hardness distribution in a wire to be adequate as described below, and the present invention was thus accomplished.

In other words, a rubber article reinforcing steel wire of the present invention is a rubber article reinforcing steel wire comprising a cross section in a width direction including a major diameter and a minor diameter, the major diameter and the minor diameter being substantially perpendicular to each other, wherein assuming that the major diameter is W, the minor diameter is T, a straight line that passes through a center of the major diameter in a width direction and is parallel to a minor diameter direction is L1, a straight line that passes through a center of the minor diameter in a width direction and is parallel to a major diameter direction is L2, an intersection point of the L1 and the L2 is a center point C, a region within a half of a distance from the center point C to a surface is a central region Rc, and a region outside the central region Rc is a surface layer region Rs, a Vickers hardness Hvc of the central region Rc is more than a Vickers hardness Hvs of the surface layer region Rs; and assuming that a Vickers hardness on the L1 in the surface layer region Rs is Hv1, and a Vickers hardness on the L2 in the surface layer region Rs is Hv2, relationships represented by Expressions (1) to (4) described below:

$$Hvc - Hv1 \leq 150 \qquad (1);$$

$$Hvc - Hv2 \leq 150 \qquad (2)$$

$$Hv1/Hvc \times 100 \geq 85.11 \qquad (3); \text{and}$$

$$Hv2/Hvc \times 100 \geq 79.84 \qquad (4)$$

are satisfied.

In the wire of the present invention, assuming that a Vickers hardness at a point that is R1×T (0<R1<0.5) apart from the center point C on the L1 is Hv3, and a Vickers hardness at a point that is R2×W (0<R2<0.5) apart from the center point C on the L2 is Hv4, relationships represented by Expressions (5) to (7) described below:

$$3.0 \leq W/T \leq 7.0 \qquad (5);$$

$$-167 \times R1^2 - 117 \times R1 + 630 \leq Hv3 \leq -167 \times R1^2 - 417 \times R1 + 950 \qquad (6); \text{and}$$

$$-375 \times R2^2 - 175 \times R2 + 630 \leq Hv4 \leq -500 \times R2^2 - 150 \times R2 + 950 \qquad (7)$$

are preferably satisfied.

In the wire of the present invention, assuming that a Vickers hardness at the center point C is Hv0, and a Vickers hardness at a position that is 0.4 W apart from the center point C on the L2 is Hv5, a relationship represented by Expression (8) described below:

$$150 \geq Hv0 - Hv5 \geq 60$$

is preferably satisfied.

Furthermore, in the wire of the present invention, as for Vickers hardness on the L1, the Vickers hardness Hv0 at the center point C is highest; and assuming that a Vickers hardness at a position that is 0.25 T apart from the center point C on the L1 is Hv6, a Vickers hardness at a position that is 0.45 T apart from the center point C on the L1 is Hv7, a Vickers hardness at a position that is 0.25 W apart from the center point C on the L2 is Hv8, and a Vickers hardness at a position that is 0.45 W apart from the center point C on the L2 is Hv9, relationships represented by Expressions (9) and (10) described below:

$$0.55 \times (Hv0+Hv7) \geq Hv6 \geq 0.45 \times (Hv0+Hv7) \quad (9); \text{ and}$$

$$0.55 \times (Hv0+Hv9) \geq Hv8 \geq 0.45 \times (Hv0+Hv9) \quad (10)$$

are preferably satisfied.

Furthermore, in the wire of the present invention, assuming that the Vickers hardness at the center point C is Hv0, a Vickers hardness at a position that is 0.3 T apart from the center point C on the L1 is Hv10, and a Vickers hardness at a position that is 0.3 W apart from the center point C on the L2 is Hv11, a relationship represented by Expression (11) described below:

$$105 \geq Hv11/Hv10 \times 100 \geq 94 \quad (11)$$

is preferably satisfied. In the wire of the present invention, the Vickers hardness Hv0 at the center point C is preferably 630 to 950.

In a rubber article of the present invention, the rubber article reinforcing steel wire of the present invention is embedded as a reinforcing material.

In the rubber article of the present invention, a major diameter of the rubber article reinforcing steel wire is preferably uniformalized in parallel with an in-plane direction.

Effects of the Invention

According to the present invention, there can be provided a rubber article reinforcing steel wire that is superior in bending fatigue properties to the related art and has a flat cross-sectional shape, and a rubber article using the wire.

MODE FOR CARRYING OUT THE INVENTION

Embodiments of the present invention will be explained in detail below with reference to the drawings.

Figure 1:
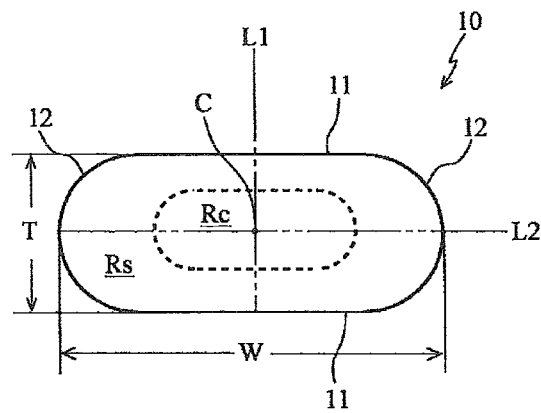
FIG. 1 illustrates an example of the cross-sectional shape of a rubber article reinforcing steel wire of the present invention.

A rubber article reinforcing steel wire 10 of the present invention comprises a cross section in a width direction including a major diameter and a minor diameter, and the major diameter and the minor diameter are substantially perpendicular to each other. FIG. 1 illustrates an example of the cross-sectional shape of the rubber article reinforcing steel wire of the present invention. In the illustrated example, the cross section in the width direction has a track shape including a pair of parallel linear portions 11 and a pair of circular arc portions 12 that are convex outward and face each other. In this case, the major diameter means the width of the wire 10 while the minor diameter means the thickness of the wire 10.

In the wire 10 of the present invention, assuming that the major diameter is W, the minor diameter is T, a straight line that passes through the center of the major diameter in a width direction and is parallel to a minor diameter direction (thickness direction) is L1, a straight line that passes through the center of the minor diameter in a width direction and is parallel to a major diameter direction (width direction) is L2, an intersection point of L1 and L2 is a center point C, a region within a half of a distance from the center point C to a surface of the wire 10 is a central region Rc (region surrounded by a dotted line in the drawing), and a region outside the central region Rc is a surface layer region Rs, the Vickers hardness Hvc of the central region Rc is more than the Vickers hardness Hvs of the surface layer region Rs.

When tension or bending force is applied to a rubber article in the state of embedding the wire 10 in rubber, similar tension or bending force is also applied to the internal wire 10. In this case, the central region Rc of the wire 10 is near the neutral axis of bending deformation and is therefore resistant to the influence of the bending force. Thus, in the wire 10 of the present invention, the Vickers hardness Hvc of the central region Re of the wire 10 is allowed to be higher than the Vickers hardness Hvs of the surface layer region Rs, to secure the tensile strength of the wire 10. In contrast, because the surface layer region Rs of the wire 10 is greatly undergoes tensile compressive force due to bending deformation, the Vickers hardness Hvs of the surface layer region Rs is set to be lower than the Vickers hardness Hvc of the central region Rc, to impart the surface layer region Rs with material properties with high ductility and to inhibit the generation of a surface crack which is a cause of fatigue fracture.

In addition, in the wire 10 of the present invention, assuming that a Vickers hardness on L1 in the surface layer region Rs is Hv1, and a Vickers hardness on L2 in the surface layer region Rs is Hv2, relationships represented by Expressions (1) to (4) described below:

$$Hvc-Hv1 \leq 150 \quad (1);$$

$$Hvc-Hv2 \leq 150 \quad (2)$$

$$Hv1/Hvc \times 100 \geq 85.11 \quad (3); \text{ and}$$

$$Hv2/Hvc \times 100 \geq 79.84 \quad (4)$$

are satisfied. This is because when the differences between the Vickers hardness Hvc of the central region Rc of the wire 10 and the Vickers hardnesses Hv1 and Hv2 of the surface region Rs are too large, the occurrence of bending deformation in the wire 10 may result in the concentration of shear distortion on a position with a low Vickers hardness, leading to the deterioration of fatigue durability.

In the wire 10 of the present invention, assuming that a Vickers hardness at an optional point that is R1×T (0<R1<0.5) apart from the center point C in a minor diameter direction (thickness direction) is Hv3, and a Vickers hardness at an optional point that is R2×W (0<R2<0.5) apart from the center point C in a major diameter direction (width direction) is Hv4, relationships represented by Expressions (5) to (7) described below:

$$3.0 \leq W/T \leq 7.0 \quad (5);$$

$$-167 \times R1^2 - 117 \times R1 + 630 \leq Hv3 \leq -167 \times R1^2 - 417 \times R1 + 950 \quad (6); \text{ and}$$

$$-375 \times R2^2 - 175 \times R2 + 630 \leq Hv4 \leq -500 \times R2^2 - 150 \times R2 + 950 \quad (7)$$

are preferably satisfied.

In the case of W/T of less than 3.0, the large thickness T of the wire 10 is required for obtaining necessary strength when the wire 10 of the present invention is used as a material for reinforcing a rubber article, so that an insufficient weight-reduction effect may be provided. In contrast, a high aspect ratio in which W/T is more than 7.0 may cause the wire 10 to crack during processing and is not preferable likewise.

Figure 2:
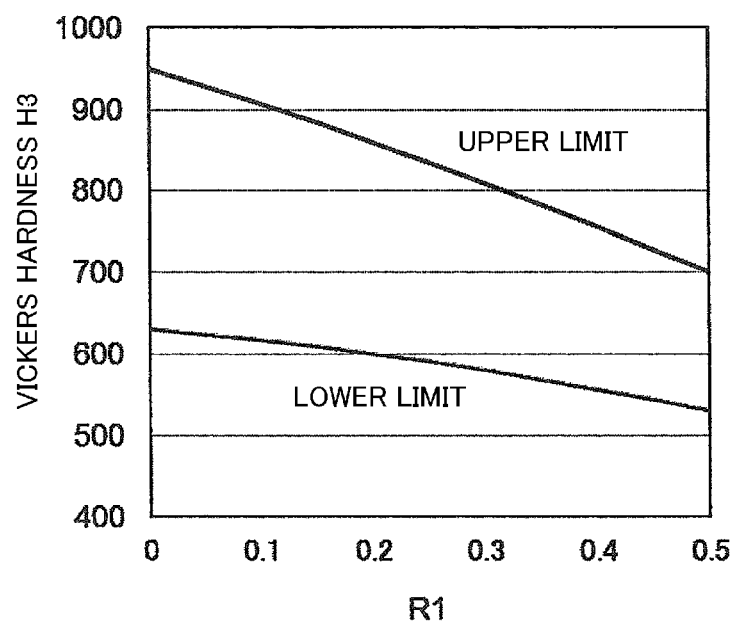
FIG. 2 is a graph showing the upper and lower limits of Hv3 in Expression (6).
Figure 3:
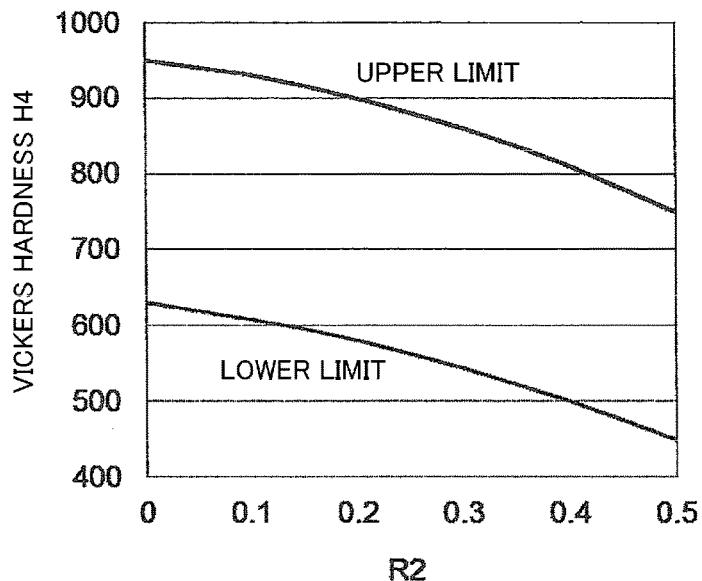
FIG. 3 is a graph showing the upper and lower limits of Hv4 in Expression (7).

In addition, when Hv3 is less than the above-described range in Expression (6), the durability of a rubber article in which the wire 10 of the present invention is embedded may be deteriorated. In contrast, when Hv3 exceeds the above-described range in Expression (6), there is a fear of cracking the wire 10 during the processing of the wire 10. Furthermore, when Hv4 is less than the above-described range in Expression (7), the durability of the rubber article in which the wire 10 of the present invention is embedded may be deteriorated. In contrast, when Hv4 exceeds the above-described range in Expression (7), there is a fear of cracking the wire 10 during the processing of the wire 10. FIG. 2 is a graph showing the upper and lower limits of Hv3 in Expression (6), and FIG. 3 is a graph showing the upper and lower limits of Hv4 in Expression (7).

In addition, in the wire 10 of the present invention, assuming that a Vickers hardness at the center point C is Hv0, and a Vickers hardness at a position that is 0.4 W apart from the center point C on L2 is Hv5, a relationship represented by Expression (8) described below:

$$150 \geq Hv0 - Hv5 \geq 60$$

is preferably satisfied. By allowing the Vickers hardness Hv5 at the position that is near the surface layer of the wire 10 to be lower than the Vickers hardness Hv0 of the center C, the wire 10 can be imparted with high ductility, to thereby inhibit a crack which is a cause of fatigue fracture from being generated on the surface of the wire 10.

Furthermore, in the wire 10 of the present invention, as for Vickers hardness on L1, the Vickers hardness Hv0 at the center point C is highest; and assuming that a Vickers hardness at a position that is 0.25 T apart from the center point C on L1 is Hv6, a Vickers hardness at a position that is 0.45 T apart from the center point C on L1 is Hv7, a Vickers hardness at a position that is 0.25 W apart from the center point C on L2 is Hv8, and a Vickers hardness at a position that is 0.45 W apart from the center point C on L2 is Hv9, relationships represented by Expressions (9) and (10) described below:

$$0.55 \times (Hv0 + Hv7) \geq Hv6 \geq 0.45 \times (Hv0 + Hv7) \quad (9); \text{ and}$$

$$0.55 \times (Hv0 + Hv9) \geq Hv8 \geq 0.45 \times (Hv0 + Hv9) \quad (10)$$

are preferably satisfied. The satisfaction of Expressions (9) and (10) allows the distribution of Vickers hardness Hv to be gentle. In other words, the unsatisfaction of Expressions (9) and (10) results in the inverted U-shaped distribution of Vickers hardness Hv with the center point C as an apex whereas the satisfaction of Expressions (9) and (10) results in the almost inverted V-shaped distribution of Vickers hardness Hv. Accordingly, the satisfaction of Expressions (9) and (10) results in the wire that is more resistant to bending fatigue.

Furthermore, in the wire 10 of the present invention, assuming that the Vickers hardness at the center point C is Hv0, a Vickers hardness at a position that is 0.3 T apart from the center point C on L1 is Hv10, and a Vickers hardness at a position that is 0.3 W apart from the center point C on L2 is Hv11, a relationship represented by Expression (11) described below:

$$105 \geq Hv11/Hv10 \times 100 \geq 94 \quad (11)$$

is preferably satisfied.

In addition, in the wire 10 of the present invention, the Vickers hardness Hv0 at the center point C is preferably 630 to 950. This is because when the Vickers hardness Hv0 at the center point C exceeds the above-described range, there is a fear of deteriorating the ductility of the wire 10, leading to the deterioration of fatigue durability. In addition, this is because when the Vickers hardness Hv0 at the center point C is less than the above-described range, the strength of the wire is decreased, so that insufficient strength may be provided for a material for reinforcing a rubber article.

The rubber article reinforcing steel wire of the present invention has been explained in detail above, but it is essential only that the wire 10 of the present invention comprises a cross section in a width direction including a major diameter and a minor diameter, the major diameter and the minor diameter being substantially perpendicular to each other, wherein assuming that the major diameter is W, the minor diameter is T, a straight line that passes through the center of the major diameter in a width direction and is parallel to a minor diameter direction is L1, a straight line that passes through the center of the minor diameter in a width direction and is parallel to a major diameter direction is L2, an intersection point of L1 and L2 is a center point C, a region within a half of a distance from the center point C to a surface is a central region Rc, and a region outside the central region Rc is a surface layer region Rs, the Vickers hardness Hvc of the central region Rc is more than the Vickers hardness Hvs of the surface layer region Rs; and the wire 10 is not particularly additionally limited.

Figure 4:
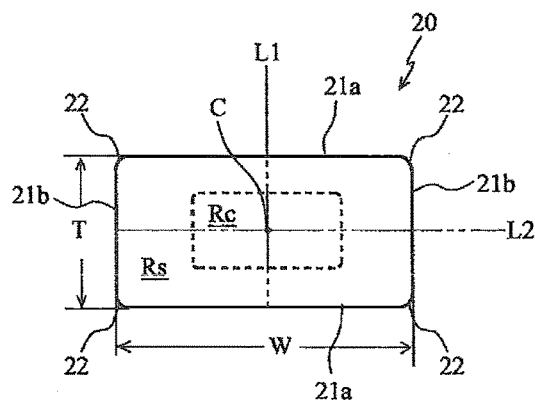
FIG. 4 illustrates another example of the cross-sectional shape of the rubber article reinforcing steel wire of the present invention.
Figure 5:
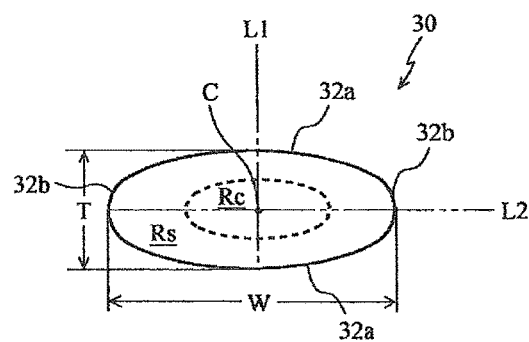
FIG. 5 illustrates still another example of the cross-sectional shape of the rubber article reinforcing steel wire of the present invention.

The cross-sectional shape of the wire of the present invention has been explained above using the wire 10 having a track shape including a pair of parallel linear portions 11 and a pair of circular arc portions 12 that are convex outward and face each other, but the cross-sectional shape of the wire of the present invention is not limited thereto. For example, FIG. 4 illustrates another example of the cross-sectional shape of the rubber article reinforcing steel wire of the present invention, and, as illustrated in the drawing, a wire 20 may have a generally rectangular shape including two pairs of parallel linear portions 21a and 21b as well as four circular arc portions 22 that connect the linear portions and are convex outward. In addition, FIG. 5 illustrates still another example of the cross-sectional shape of the rubber article reinforcing steel wire of the present invention, and, as illustrated in the drawing, a wire 30 may have an oval shape including a pair of circular arc portions 32a that are convex outward as well as circular arc portions 32b that have a less radius of curvature than that of the circular arcs and are convex outward.

In addition, the material or the like of the wire of the present invention is not particularly limited, any material can be used if being used conventionally, and a high carbon steel with 0.80 mass % or more of carbon component is preferable. Use of the high carbon steel with 0.80 mass % or more of carbon component, which has high hardness, as the material of the wire enables the effects of the present invention to be favorably obtained. In contrast, more than 1.5 mass % of carbon component is not preferred because of resulting in deteriorated ductility and in poor fatigue resistance.

The wire of the present invention can be manufactured by utilizing a conventional facility and step for manufacturing a normal wire having a circular cross section without being changed. Specifically, it can be economically and easily manufactured, e.g., by rolling it between rollers in the latter part of wire drawing or by passing it through the die of a flat hole, to allow it to be flat. In this case, it is essential only to appropriately set the conditions of the wire drawing and rolling of the wire so that the physical properties of the finally obtained wire satisfy the above-described requirements. For example, the rolling is performed by cold rolling processing using plural rolling stands including a pair of rolls of 120 mm or less in diameter. In this case, a rolling reduction at each pass in the cold rolling is set at 15% or less, a rolling reduction at each pass is set at not less than (rolling reduction at previous pass—1.0%), and back tension that is 3 to 20% of steel wire rupture strength is applied before processing at each pass.

A rubber article of the present invention will be explained below.

In the rubber article of the present invention, the above-described rubber article reinforcing steel wire of the present invention is embedded as a reinforcing material in rubber. Examples of the rubber article of the present invention include tires, industrial belts, and the like, and are particularly tires. When the rubber article of the present invention is applied to a tire or an industrial belt, the major diameter of the wire is preferably uniformalized in parallel with the in-plane direction of the tire or the industrial belt. As a result, the rubber article can be allowed to have a reduced thickness, to be excellent in view of weight reduction. For example, when the wires 10, 20, and 30 are used in a belt for reinforcing a tire, it is essential only to arrange the wires 10, 20, and 30 to have width directions uniformalized with respect to the in-plane direction of the belt. Because the wires 10, 20, and 30 of the present invention are excellent in fatigue durability, the fatigue durability of the obtained tire can also be improved.

EXAMPLES

The present invention will be explained in more detail below with reference to examples.

Examples 1 to 12 and Comparative Examples 1 to 6

Rubber article reinforcing steel wires having cross-sectional shapes and Vickers hardness distributions listed in Tables 1 to 3 below were produced. A three-point bending fatigue test of each of the obtained wire was conducted to evaluate the fatigue properties of the wires. In addition, Hvc in Tables is a Vickers hardness $Hv0$ at a center point C, $Hv1$, $Hv3$, or $Hv10$ is a Vickers hardness at a position that is $0.3 \times T$ ($R1=0.3$) apart from the center point C of each wire in a minor diameter direction, and $Hv2$, $Hv4$, or $Hv5$ is Vickers hardness at a position that is $0.4 \times W$ ($R2=0.4$) apart from the center point C of each wire in a major diameter direction. In this case, the range of Expression (6) is from 580 to 810, and the range of Expression (7) is from 500 to 810. In addition, a Vickers hardness testing machine HM-11 manufactured by Mitutoyo Corporation was used for measuring Vickers hardness.

(Three-Point Bending Fatigue Test)

The number of times of application of repeated bending force in the state of applying a tensile load to each wire until a fracture occurred was measured. In the tables, such obtained values are listed together as indices based on 100 in Comparative Example 1. The higher value shows superior fatigue resistance.

TABLE 1

|  |  |  | Comparative Example 1 | Example 1 | Example 2 | Example 3 | Example 4 | Example 5 |
|---|---|---|---|---|---|---|---|---|
| Cross-Sectional Shape of Wire |  |  | Track shape | Track shape | Rectangular shape | Track shape | Oval shape | Track shape |
| Corresponding Drawing |  |  | FIG. 1 | FIG. 1 | FIG. 4 | FIG. 1 | FIG. 5 | FIG. 1 |
| Wire Diameter (mm) | Thickness T |  | 0.20 | 0.19 | 0.21 | 0.21 | 0.20 | 0.30 |
|  | Width W |  | 1.20 | 0.65 | 0.85 | 0.90 | 1.35 | 0.92 |
| Width/Thickness Ratio | W/T |  | 6.0 | 3.4 | 4.0 | 4.3 | 6.8 | 3.1 |
| Vickers Hardness (HV) | Hvc (Hv0) |  | 810 | 940 | 810 | 930 | 800 | 730 |
|  | Thickness Direction | Hv1 (Hv3, Hv10) | 705 | 800 | 710 | 805 | 705 | 670 |
|  |  | Hv6 | — | — | — | — | — | — |
|  |  | Hv7 | — | — | — | — | — | — |
|  |  | Hv0 − Hv1 | 105 | 140 | 100 | 125 | 95 | 60 |
|  |  | 0.55 × (Hv0 + Hv7) | — | — | — | — | — | — |
|  |  | 0.45 × (Hv0 + Hv7) | — | — | — | — | — | — |
|  | Width Direction | Hv2 (Hv4, Hv5) | 640 | 805 | 700 | 790 | 660 | 675 |
|  |  | Hv8 | — | — | — | — | — | — |
|  |  | Hv9 | — | — | — | — | — | — |
|  |  | Hv11 | 685 | 840 | 728 | 830 | 696 | 692 |
|  |  | Hv0 − Hv5 | 170 | 135 | 110 | 140 | 140 | 55 |
|  |  | 0.55 × (Hv0 + Hv9) | — | — | — | — | — | — |
|  |  | 0.45 × (Hv0 + Hv9) | — | — | — | — | — | — |
| Vickers Hardness Ratio | Hv1/Hvc × 100 |  | 87.04 | 85.11 | 87.65 | 86.56 | 88.13 | 91.78 |
|  | Hv5/Hvc × 100 |  | 79.01 | 85.64 | 86.42 | 84.95 | 82.50 | 92.47 |
|  | Hv11/Hv10 × 100 |  | 97.16 | 105.00 | 102.54 | 103.11 | 98.72 | 103.28 |
| Three-Point Bending Fatigue Test (Index) |  |  | 100 | 106 | 125 | 120 | 124 | 109 |

TABLE 2

|  |  | Example 6 | Example 7 | Comparative Example 2 | Comparative Example 3 | Comparative Example 4 | Comparative Example 5 |
|---|---|---|---|---|---|---|---|
| Cross-Sectional Shape of Wire |  | Rectangular shape | Track shape | Oval shape | Rectangular shape | Track shape | Rectangular shape |
| Corresponding Drawing |  | FIG. 4 | FIG. 1 | FIG. 5 | FIG. 4 | FIG. 1 | FIG. 4 |
| Wire Diameter (mm) | Thickness T | 0.32 | 0.32 | 0.19 | 0.21 | 0.31 | 0.32 |
|  | Width W | 1.40 | 1.45 | 0.72 | 0.86 | 1.50 | 1.40 |

TABLE 2-continued

| | | | Example 6 | Example 7 | Comparative Example 2 | Comparative Example 3 | Comparative Example 4 | Comparative Example 5 |
|---|---|---|---|---|---|---|---|---|
| Width/Thickness Ratio | | W/T | 4.4 | 4.5 | 3.8 | 4.1 | 4.8 | 4.4 |
| Vickers Hardness (HV) | | Hvc (Hv0) | 645 | 720 | 940 | 960 | 750 | 705 |
| | Thickness Direction | Hv1 (Hv3, Hv10) | 590 | 630 | 780 | 790 | 615 | 610 |
| | | Hv6 | — | — | — | — | — | — |
| | | Hv7 | — | — | — | — | — | — |
| | | Hv0 − Hv1 | 55 | 90 | 160 | 170 | 135 | 95 |
| | | 0.55 × (Hv0 + Hv7) | — | — | — | — | — | — |
| | | 0.45 × (Hv0 + Hv7) | — | — | — | — | — | — |
| | Width Direction | Hv2 (Hv4, Hv5) | 515 | 600 | 770 | 780 | 585 | 530 |
| | | Hv8 | — | — | — | — | — | — |
| | | Hv9 | — | — | — | — | — | — |
| | | Hv11 | 556 | 635 | 815 | 828 | 633 | 580 |
| | | Hv0 − Hv5 | 130 | 120 | 170 | 180 | 165 | 175 |
| | | 0.55 × (Hv0 + Hv9) | — | — | — | — | — | — |
| | | 0.45 × (Hv0 + Hv9) | — | — | — | — | — | — |
| Vickers Hardness Ratio | | Hv1/Hvc × 100 | 91.47 | 87.50 | 82.98 | 82.29 | 82.00 | 86.52 |
| | | Hv5/Hvc × 100 | 79.84 | 83.33 | 81.91 | 81.25 | 78.00 | 75.18 |
| | | Hv11/Hv10 × 100 | 94.24 | 100.79 | 104.49 | 104.81 | 102.93 | 95.08 |
| Three-Point Bending Fatigue Test (Index) | | | 132 | 119 | 91 | 82 | 87 | 99 |

TABLE 3

| | | | Comparative Example 6 | Example 8 | Example 9 | Example 10 | Example 11 | Example 12 |
|---|---|---|---|---|---|---|---|---|
| Cross-Sectional Shape of Wire | | | Track shape | Track shape | Track shape | Oval shape | Rectangular shape | Track shape |
| Corresponding Drawing | | | FIG. 1 | FIG. 1 | FIG. 1 | FIG. 5 | FIG. 4 | FIG. 1 |
| Wire Diameter (mm) | | Thickness T | 0.32 | 0.29 | 0.21 | 0.20 | 0.21 | 0.19 |
| | | Width W | 1.45 | 0.95 | 0.90 | 1.35 | 0.85 | 0.65 |
| Width/Thickness Ratio | | W/T | 4.5 | 3.3 | 4.3 | 6.8 | 4.0 | 3.4 |
| Vickers Hardness (HV) | | Hvc (Hv0) | 745 | 740 | 945 | 760 | 810 | 940 |
| | Thickness Direction | Hv1 (Hv3, Hv10) | 585 | 690 | 805 | 695 | 710 | 800 |
| | | Hv6 | — | — | — | — | 728 | 825 |
| | | Hv7 | — | — | — | — | 655 | 580 |
| | | Hv0 − Hv1 | 160 | 50 | 140 | 65 | 100 | 140 |
| | | 0.55 × (Hv0 + Hv7) | — | — | — | — | 806 | 836 |
| | | 0.45 × (Hv0 + Hv7) | — | — | — | — | 659 | 684 |
| | Width Direction | Hv2 (Hv4, Hv5) | 605 | 685 | 805 | 613 | 700 | 805 |
| | | Hv8 | — | — | — | — | 745 | 870 |
| | | Hv9 | — | — | — | — | 680 | 635 |
| | | Hv11 | 640 | 700 | 853 | 652 | 728 | 840 |
| | | Hv0 − Hv5 | 140 | 55 | 140 | 147 | 110 | 135 |
| | | 0.55 × (Hv0 + Hv9) | — | — | — | — | 820 | 866 |
| | | 0.45 × (Hv0 + Hv9) | — | — | — | — | 671 | 709 |
| Vickers Hardness Ratio | | Hv1/Hvc × 100 | 78.52 | 93.24 | 85.19 | 91.45 | 87.65 | 85.11 |
| | | Hv5/Hvc × 100 | 81.21 | 92.57 | 85.19 | 80.66 | 86.42 | 85.64 |
| | | Hv11/Hv10 × 100 | 109.40 | 101.45 | 105.96 | 93.81 | 102.54 | 105.00 |
| Three-Point Bending Fatigue Test (Index) | | | 88 | 105 | 104 | 107 | 125 | 106 |

Tables 1 to 3 described above reveals that the wire of the present invention is excellent in bending fatigue properties.

DESCRIPTION OF SYMBOLS 10, 20, 30 Rubber article reinforcing wire
11, 21 Linear portion
12, 22, 32 Circular arc portion

The invention claimed is:

1. A rubber article reinforcing steel wire, comprising a cross section in a width direction including a major diameter and a minor diameter, the major diameter and the minor diameter being substantially perpendicular to each other, wherein
when the major diameter is W, the minor diameter is T, a straight line that passes through a center of the major diameter in a width direction and is parallel to a minor diameter direction is L1, a straight line that passes through a center of the minor diameter in a width direction and is parallel to a major diameter direction is L2, an intersection point of the L1 and the L2 is a center point C, a region within a half of a distance from the center point C to a surface is a central region Rc, and a region outside the central region Rc is a surface layer region Rs, a Vickers hardness Hvc of the central region Rc is more than a Vickers hardness Hvs of the surface layer region Rs; and
when a Vickers hardness on the L1 in the surface layer region Rs is Hv1, and a Vickers hardness on the L2 in the surface layer region Rs is Hv2, relationships represented by Expressions (1) to (4) described below:

$$Hvc - Hv1 \leq 150 \quad (1);$$

$$Hvc - Hv2 \leq 150 \quad (2)$$

$$Hv1/Hvc \times 100 \geq 85.11 \quad (3); \text{ and}$$

$$Hv2/Hvc \times 100 \geq 79.84 \quad (4)$$

are satisfied.

2. The rubber article reinforcing steel wire according to claim 1, wherein when a Vickers hardness at a point that is R1×T apart from the center point C on the L1 is Hv3, where (0<R1<0.5) and a Vickers hardness at a point that is R2×W apart from the center point C on the L2 is Hv4, where (0<R2<0.5) relationships represented by Expressions (5) to (7) described below:

$$3.0 \leq W/T \leq 7.0 \quad (5);$$

$$-167 \times R1^2 - 117 \times R1 + 630 \leq Hv3 \leq -167 \times R1^2 - 417 \times R1 + 950 \quad (6); \text{ and}$$

$$-375 \times R2^2 - 175 \times R2 + 630 \leq Hv4 \leq -500 \times R2^2 - 150 \times R2 + 950 \quad (7)$$

are satisfied.

3. The rubber article reinforcing steel wire according to claim 1, wherein when a Vickers hardness at the center point C is Hv0, and a Vickers hardness at a position that is 0.4 W apart from the center point C on the L2 is Hv5, a relationship represented by Expression (8) described below:

$$150 \geq Hv0 - Hv5 \geq 60$$

is satisfied.

4. The rubber article reinforcing steel wire according to claim 1, wherein as for Vickers hardness on the L1, the Vickers hardness Hv0 at the center point C is highest; and when a Vickers hardness at a position that is 0.25 T apart from the center point C on the L1 is Hv6, a Vickers hardness at a position that is 0.45 T apart from the center point C on the L1 is Hv7, a Vickers hardness at a position that is 0.25 W apart from the center point C on the L2 is Hv8, and a Vickers hardness at a position that is 0.45 W apart from the center point C on the L2 is Hv9, relationships represented by Expressions (9) and (10) described below:

$$0.55 \times (Hv0 + Hv7) \geq Hv6 \geq 0.45 \times (Hv0 + Hv7) \quad (9); \text{ and}$$

$$0.55 \times (Hv0 + Hv9) \geq Hv8 \geq 0.45 \times (Hv0 + Hv9) \quad (10)$$

are satisfied.

5. The rubber article reinforcing steel wire according to claim 1, wherein when the Vickers hardness at the center point C is Hv0, a Vickers hardness at a position that is 0.3 T apart from the center point C on the L1 is Hv10, and a Vickers hardness at a position that is 0.3 W apart from the center point C on the L2 is Hv11, a relationship represented by Expression (11) described below:

$$105 \geq Hv11/Hv10 \times 100 \geq 94 \quad (11)$$

is satisfied.

6. The rubber article reinforcing steel wire according to claim 1, wherein the Vickers hardness Hv0 at the center point C is 630 to 950.

7. A rubber article, in which the rubber article reinforcing steel wire according to claim 1 is embedded as a reinforcing material.

8. The rubber article according to claim 7, wherein a major diameter of the rubber article reinforcing steel wire is uniformalized in parallel with an in-plane direction.

* * * * *